United States Patent
De Zeeuw et al.

(10) Patent No.: US 10,948,465 B2
(45) Date of Patent: Mar. 16, 2021

(54) CRESCENT PLOT COLUMNS AND METHODS FOR PREPARING CRESCENT PLOT COLUMNS

(71) Applicant: RESTEK CORPORATION, Bellefonte, PA (US)

(72) Inventors: Jaap De Zeeuw, Middelburg (NL); William P. Bromps, Cameron Park, CA (US); Tracey Peters, Bellefonte, PA (US); Thomas E. Kane, Bellefonte, PA (US)

(73) Assignee: RESTEK CORPORATION, Bellefonte, PA (US)

( * ) Notice: Subject to any disclaimer, the term of this patent is extended or adjusted under 35 U.S.C. 154(b) by 142 days.

(21) Appl. No.: 16/019,760

(22) Filed: Jun. 27, 2018

(65) Prior Publication Data
US 2018/0340920 A1 Nov. 29, 2018

Related U.S. Application Data

(63) Continuation-in-part of application No. PCT/US2016/068726, filed on Dec. 27, 2016, and a
(Continued)

(51) Int. Cl.
*B01D 53/02* (2006.01)
*G01N 30/60* (2006.01)
(Continued)

(52) U.S. Cl.
CPC .... *G01N 30/6078* (2013.01); *B01J 20/28052* (2013.01); *G01N 30/56* (2013.01);
(Continued)

(58) Field of Classification Search
CPC .............. B01J 20/28052; B01J 2220/54; B01J 2220/86; G01N 2030/025;
(Continued)

(56) References Cited

U.S. PATENT DOCUMENTS

| 2,817,970 A | 1/1953 | Whitby |
| 5,384,042 A | 1/1995 | Afeyan et al. |

(Continued)

FOREIGN PATENT DOCUMENTS

| GB | 1135522 | 12/1968 |
| WO | 2009073270 A1 | 6/2009 |
| WO | 2015047598 A2 | 4/2015 |

OTHER PUBLICATIONS

PCT Search Report, PCT/US2016/68359, dated May 19, 2017.
PCT Search Report, PCT/US2016/68726, dated Mar. 13, 2017.

*Primary Examiner* — Christopher P Jones
(74) *Attorney, Agent, or Firm* — McNees Wallace & Nurick LLC

(57) ABSTRACT

A crescent PLOT column is disclosed, including a capillary column having an inlet, an outlet, a bore, and an inner surface surrounding the bore and extending between the inlet and the outlet. A layer of particles is localized on a radial portion of the inner surface. The layer of the particles includes a radial thickness decreasing from a center of the radial portion to a periphery of the radial portion, forming a crescent shape in a radial frame of reference. A method for preparing the crescent PLOT column is disclosed, including loading the capillary column with a fluid including a carrier and particles such that the fluid is contained within the capillary column. The capillary column and the fluid contained within the capillary column are subjected to a centrifugal force. The carrier is removed, and a layer of the particles is localized on the radial portion of the inner surface.

20 Claims, 12 Drawing Sheets

Related U.S. Application Data continuation-in-part of application No. PCT/US2016/068359, filed on Dec. 22, 2016.

(60) Provisional application No. 62/271,458, filed on Dec. 28, 2015.

(51) Int. Cl.
| | | |
|---|---|---|
| *G01N 30/56* | (2006.01) | |
| *B01J 20/28* | (2006.01) | |
| *G01N 30/02* | (2006.01) | |
| *G01N 30/52* | (2006.01) | |

(52) U.S. Cl.
CPC ....... *G01N 30/606* (2013.01); *G01N 30/6026* (2013.01); *B01J 2220/54* (2013.01); *B01J 2220/86* (2013.01); *G01N 30/6073* (2013.01); *G01N 2030/025* (2013.01); *G01N 2030/525* (2013.01); *G01N 2030/567* (2013.01); *G01N 2030/6013* (2013.01)

(58) Field of Classification Search
CPC ....... G01N 2030/525; G01N 2030/567; G01N 2030/6013; G01N 30/56; G01N 30/6026; G01N 30/606; G01N 30/6073; G01N 30/6078

See application file for complete search history.

(56) References Cited

U.S. PATENT DOCUMENTS

| | | |
|---|---|---|
| 8,132,443 B2 | 3/2012 | McGill et al. |
| 9,075,068 B2 | 7/2015 | Peene et al. |
| 2004/0200776 A1 | 10/2004 | Ivanov et al. |
| 2009/0203146 A1* | 8/2009 | Karger ............... B01J 20/327 436/43 |
| 2012/0118156 A1 | 5/2012 | Steinecker |
| 2014/0033804 A1 | 2/2014 | Karger et al. |

* cited by examiner

CRESCENT PLOT COLUMNS AND METHODS FOR PREPARING CRESCENT PLOT COLUMNS

RELATED APPLICATIONS

This application claims the benefit of and priority to U.S. Prov. App. No. 62/271,458, filed Dec. 28, 2015, which is hereby incorporated by reference in its entirety.

FIELD OF THE INVENTION

This application is directed to gas chromatography ("GC") porous layer open tubular ("PLOT") columns and methods for forming GC PLOT columns. More specifically, this application is directed to crescent PLOT columns and methods for forming crescent PLOT columns with gravitational deposition.

BACKGROUND OF THE INVENTION

PLOT columns have been advantageously used for analysis of volatile compounds in gas chromatography. These columns provide high selectivity, which enables optimization of analysis time and increases in laboratory efficiency.

PLOT columns include a column with a thin layer of porous material coating the internal surface of the column. The porous material may be selected based on the materials to be separated, but the retention times for materials in the PLOT columns depend not only on the porous material, but also the column surface on which the porous material is deposited. PLOT columns have been prepared using molecular sieves, alumina, and porous polymers. The PLOT columns may be coated with the porous material using a suspension of the porous material, and then removing the suspension medium to yield a stable uniform layer, or the porous layer may be formed by in-situ polymerization or other chemical reaction.

Generally, the porous material in PLOT columns forms a layer 5-50 μm thick on the inner walls of the column, but these layers tend to be fragile, and the particles of the porous material may dislodge and move during operation. This movement of particles may contaminate detectors, damage valves, increase noise, or even obstruct the column or connectors used. Attempts at improvements in these respects have been disclosed in U.S. Pat. No. 4,793,920 (which discloses a porous plug to catch eluting particles, but which is subject itself to pressure drop-causing blockages), and U.S. Pat. Nos. 5,599,445, 5,607,580, 5,609,756, 5,620,603, and 5,630,937 (which disclose using siloxane polymers to bond the porous material).

Standard commercial techniques for PLOT column production employ coating processes that deposit a full concentric coated inner surface of the column. Scientific literature describing these coating techniques stress the need for a uniform and even thickness layer throughout the column.

Standard commercial techniques employ evaporation-based mechanisms, where vacuum and/or heat is applied and the liquid-gas interface of the solvent propagates down the column as the solvent evaporates. As the solvent front moves further down the column and away from the column opening, the conductance of the volatized solvent decreases and the vacuum in turn decreases. The linear loss of vacuum pressure and the increase in flow resistance results in a practical limit to the length of column that may be prepared as a PLOT column. Standard commercial techniques relying on heat and vacuum also take several hours to achieve for comparatively short lengths of column (30 meters). Deposition procedures relying on localized solvent removal often exhibit irregularly coated surfaces. This is due to the turbulent solvent boiling and off-gassing at the liquid-vapor interface where the PLOT layer is deposited.

There are also practical limits to the inner diameter and length of the column able to be prepared with conventional techniques, because the evaporation-deposition process is dependent on the ability to apply consistent low pressures and evenly remove solvent along the full axial length of the column. As the column length increases, the pressure differential greatly increases from the open end of the column and the site down the column where the evaporation is occurring.

The inner surface of the column may have chemical activity toward select analyte compounds. It is possible to first deactivate, or chemically coat the full inner surface of the column prior to deposition of the crescent. It is also possible to employ a chemical coating that is 'sticky' as well as inert. This technique was described in U.S. Pat. No. 9,075,068, in which adhesive traps were localized to the capillary ends or coated over the PLOT layer itself. In the latter case, the chromatographic behavior of the underlying PLOT layer is likely compromised.

With respect to fugitive PLOT particles that are generated during use, the particles may be generated anywhere along the length of the PLOT coated surface, but the prior art solutions all describe particle trap-like devices, where the trap is localized at the column ends. This inherently results in a smaller trap capacity with respect to the PLOT layer within the column, and the requirement the particle trap ends or 'tails' be adequately long enough to ensure the capture of all fugitive particles. The presence of unique particle trap 'tails' also eliminate the possibility of trimming the columns, which is a common practice in the GC analysis during initial installation and follow-on column maintenance practices. Also when particle traps are connected, the application in vacuum detection systems is problematic as the connections are difficult to create a sufficiently good seal.

Accordingly, it would be desirable to provide PLOT columns and methods for forming PLOT columns not suffering from the above-described drawbacks.

BRIEF DESCRIPTION OF THE INVENTION

In one exemplary embodiment, a crescent PLOT column includes a capillary column. The capillary column includes an inlet, an outlet, a bore, and an inner surface surrounding the bore and extending between the inlet and the outlet. A layer of particles is localized on a radial portion of the inner surface. The layer of the particles includes a radial thickness decreasing from a center of the radial portion to a periphery of the radial portion, forming a crescent shape in a radial frame of reference.

In another exemplary embodiment, a method for preparing a crescent PLOT column includes loading a capillary column with a fluid such that the fluid is contained within the capillary column. The capillary column includes an inlet, an outlet, a bore, and an inner surface surrounding the bore and extending between the inlet and the outlet. The fluid includes a carrier and particles. The capillary column and the fluid contained within the capillary column are subjected to a centrifugal force. The carrier is removed, and a layer of the particles is localized on a radial portion of the inner surface. The layer of the particles includes a radial thickness decreasing from a center of the radial portion to a periphery of the radial portion, forming a crescent shape in a radial frame of reference.

BRIEF DESCRIPTION OF THE DRAWINGS

Wherever possible, the same reference numbers will be used throughout the drawings to represent the same parts.

DETAILED DESCRIPTION OF THE INVENTION

Figure 1:
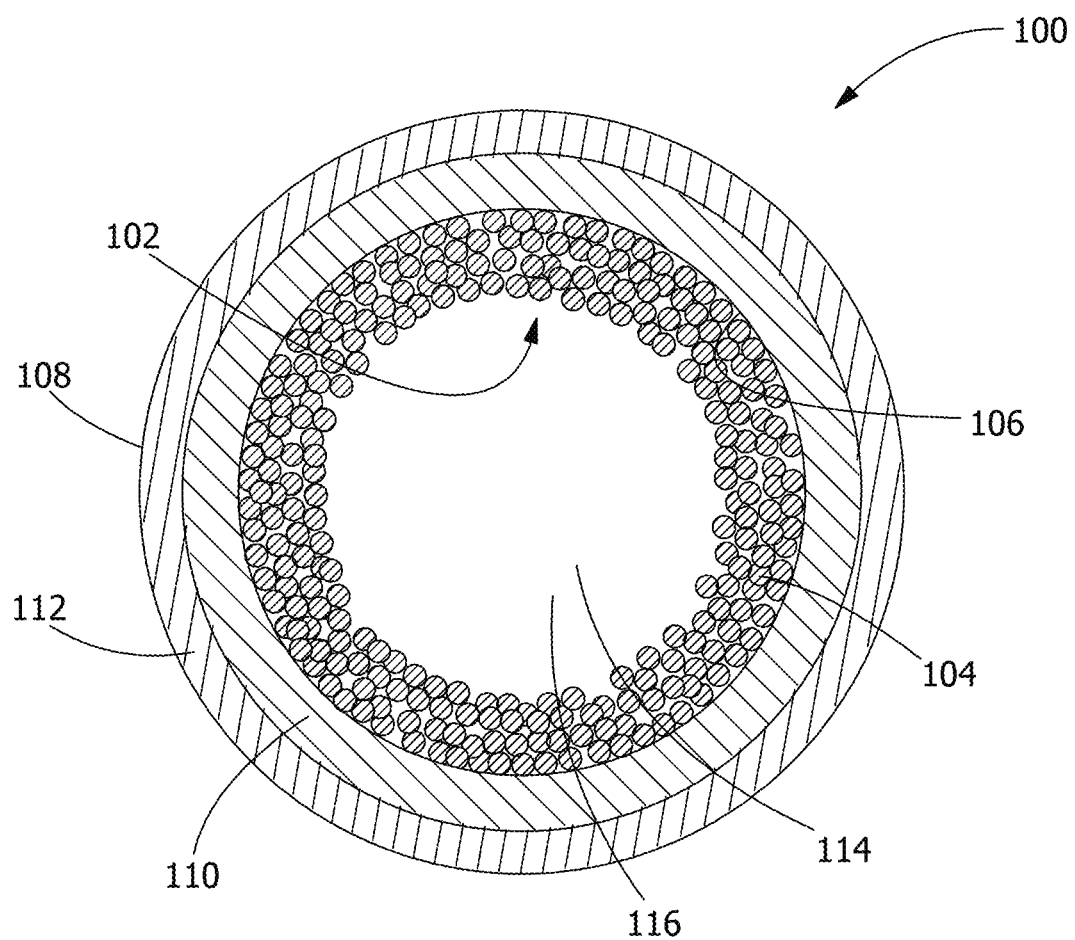
FIG. 1 is a sectional view of a standard PLOT column.

Referring to FIG. 1, in a standard PLOT column 100, a layer 102 of particles 104 is disposed on an inner surface 106 of a capillary column 108. The layer 102 is essentially uniform radially around the inner surface 106 of the capillary column 108 and axially along the capillary column 108. The capillary column 108 of a standard PLOT column 100 may be formed from any suitable capillary material 110 such as fused silica. The capillary column 108 may further include an exterior coating 112, such as polyimide for mechanical strength. The inner surface 106 surrounds a bore 114. The particles 104 are porous, the porosity of the particles 104 contributing to chromatographic separation of gaseous samples passing through the PLOT column 100. The bore 114 of the PLOT column 100 includes an open region 116 surrounded by the layer 102 of particles 104 for the passage of high velocity carrier gasses while reducing pressure drops in comparison to a fully packed column.

Figure 2:
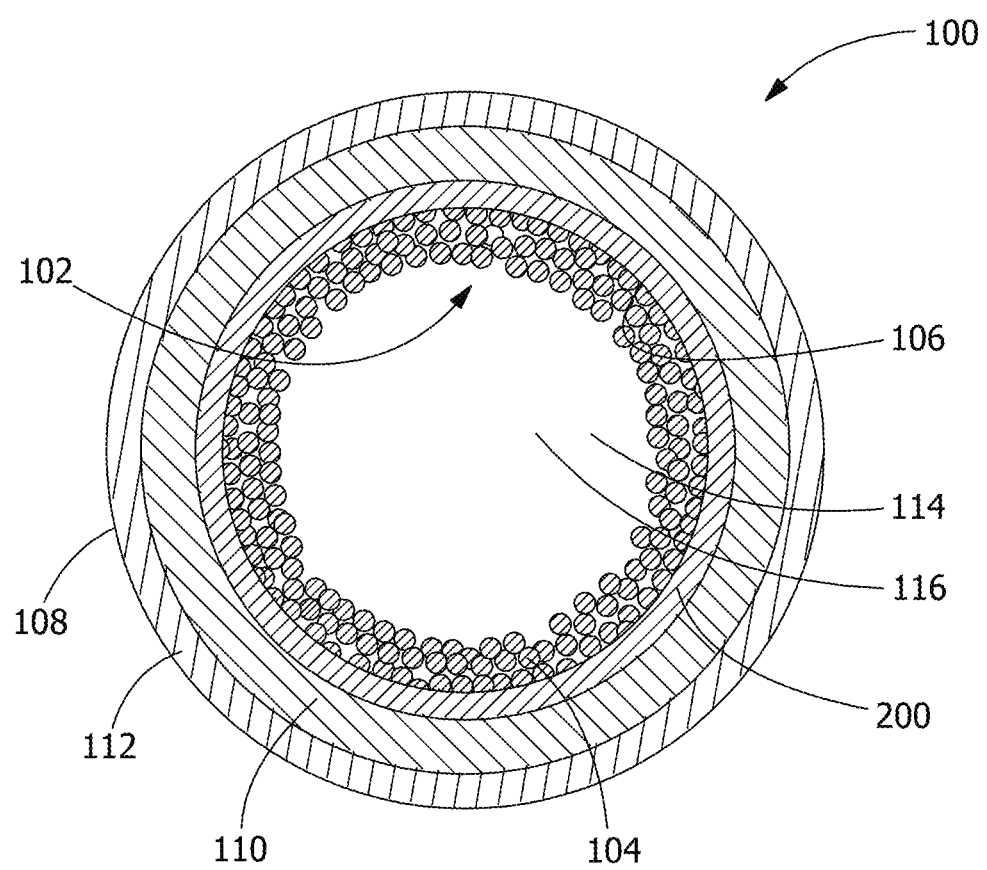
FIG. 2 is a sectional view of a standard PLOT column having an interior coating.

Referring to FIG. 2, a standard PLOT column 100 may further include an interior coating 200 on the capillary material 110 forming the inner surface 106. The interior coating 200 may serve as an intermediate between the capillary material 110 and the layer 102 of particles 104. The interior coating 200 may be formed from any suitable material, such as organosilanes which reduce the silanol activity of the capillary material 110 (deactivation). Other surface modifications known to those in the art may also be employed and include the use of siloxanes and polyethylene glycols.

Figure 3:
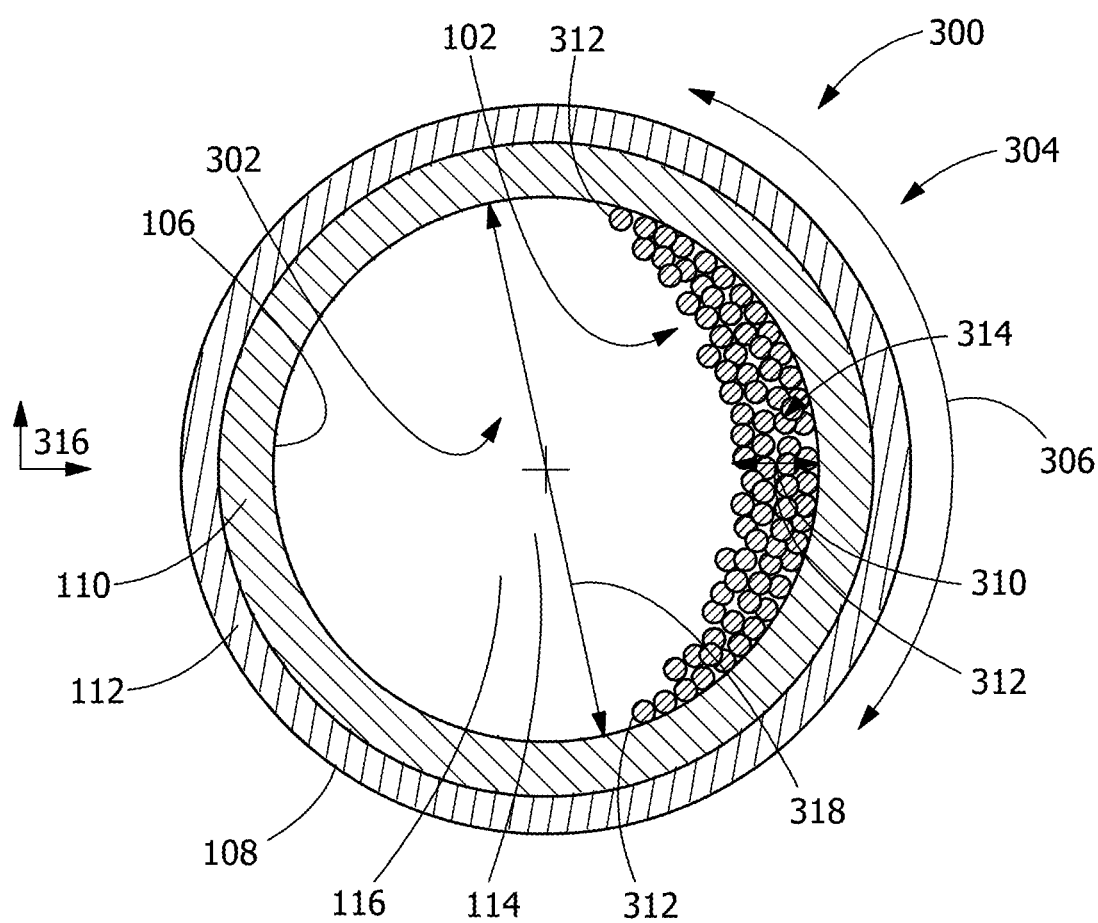
FIG. 3 is a sectional view of a crescent PLOT column, according to an embodiment of the present disclosure.

Referring to FIG. 3, in one embodiment, a crescent PLOT column 300 includes a capillary column 108. The capillary column 108 includes an inlet 302, and outlet 304, a bore 114, and an inner surface 106 surrounding the bore 114 and extending between the inlet 302 and the outlet 304. A layer 102 of particles 104 is localized on a radial portion 306 of the inner surface 106. The remainder of the inner surface excepting the radial portion 306 remains exposed to the open region 116. The layer 102 of the particles 104 includes a radial thickness 308 which decreases (subject to de minimus surface variations and defects which may deviate from the decrease) from a center 310 of the radial portion 306 to a periphery 312 of the radial portion 306, forming a crescent shape 314 in a radial frame of reference 316. The capillary column 108 may include any suitable capillary material 110, such as, but not limited to, fused silica, metal, or a combination thereof. The capillary column 108 may further include an exterior coating 112, such as, but not limited to, a polyimide. Other materials for the exterior coating 112 include metal and other polymers such as polytetrafluoroethylene (PTFE).

Without being bound by theory, it is believed that because the separation mechanism for PLOT-based columns are adsorption driven (rather than dissolution of the analyte into a coated phase), particles 104 in the layer 102 having the crescent shape 314 will interact with an analyte essentially equivalently.

The particles 104 may be porous, non-porous, or a mixture of porous and non-porous particles 104. The particles 104 may include an organic polymer, an inorganic material, combinations thereof, or mixtures thereof. In one embodiment, the particles 104 include a solid substrate and a chromatographic phase disposed on the solid substrate. Particles 104 can be regular and/or irregular in shape and may vary in size from about 1 nm up to about 2000 nm.

The capillary column 108 may include any suitable capillary inner diameter 318, including, but not limited to, a capillary inner diameter 318 of between about 0.1 mm and about 1.0 mm. It will further be appreciated that in some embodiments, microchannel capillary columns may also be employed for PLOT columns. In these cases the bore may be oval, rectangular, or square in shape.

Figure 4:
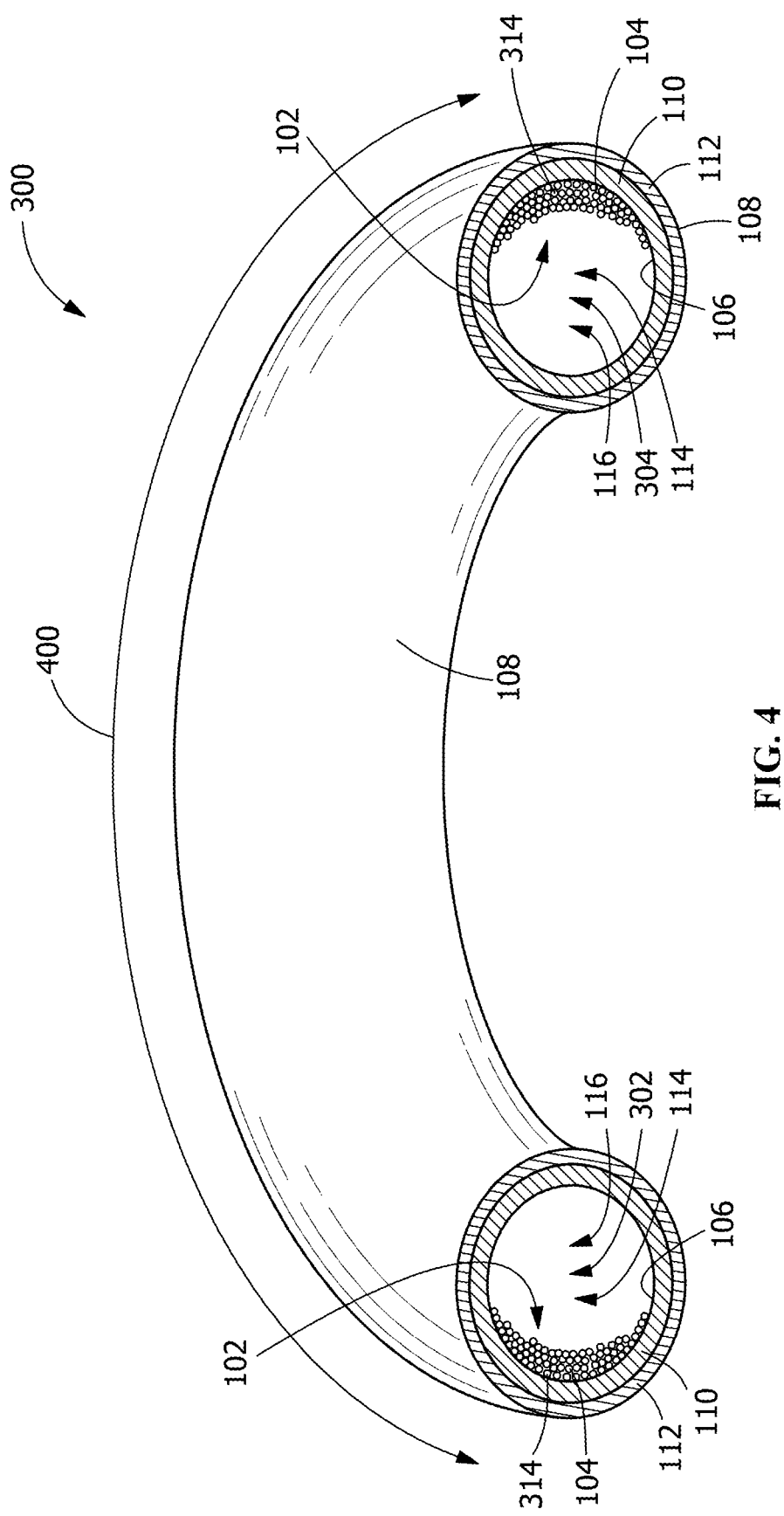
FIG. 4 is a perspective view of a section of the crescent PLOT column of FIG. 3, according to an embodiment of the present disclosure.

Referring to FIG. 4, in one embodiment, the layer 102 of particles 104 is essentially uniform along an axial length 400 of the inner surface 106. As used herein, "essentially uniform" indicates that the layer 102 of particles 104 does not deviate along the axial length 400 by thickness, width, or shape, by more than about 10%, excepting at the inlet 302 and outlet 304, which may deviate by up to about 50%. The axial length 400 may be any suitable length, including, but not limited to a length of between about 1.0 m and about 100 m.

Figure 5:
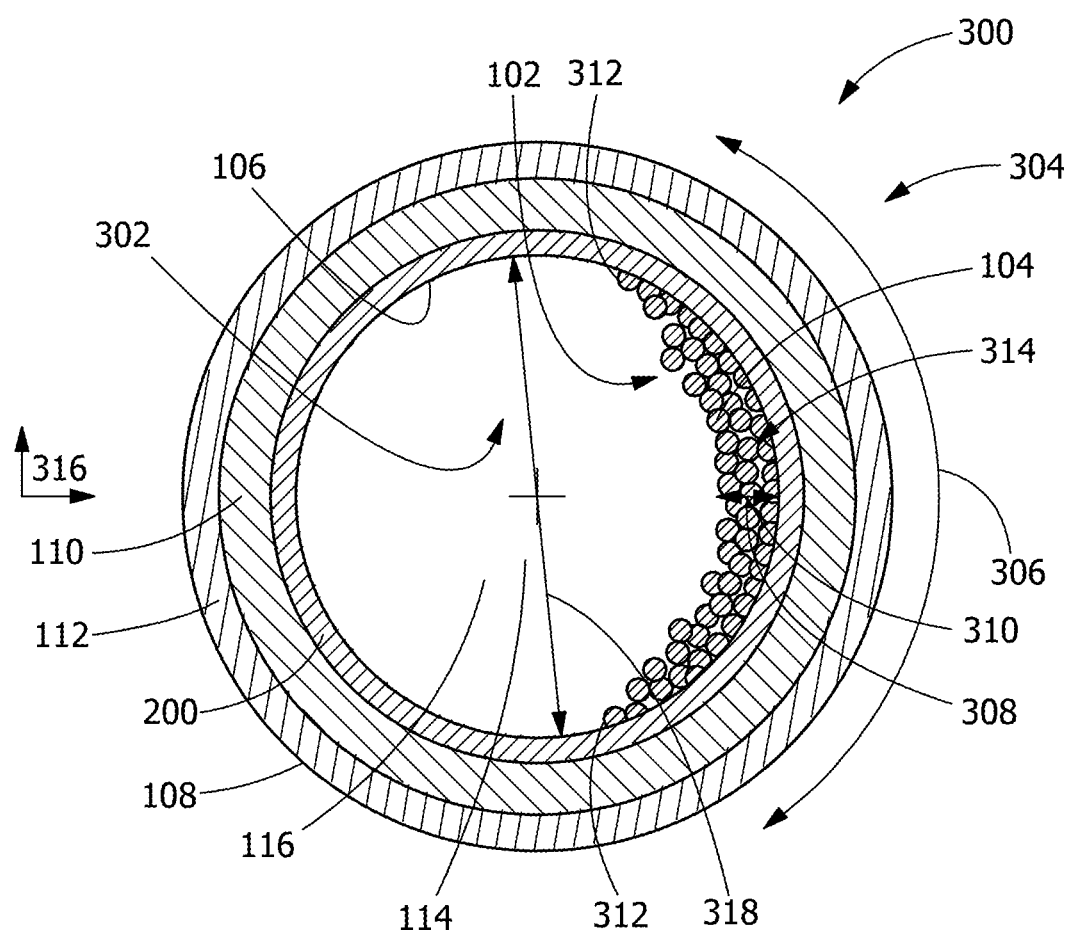
FIG. 5 is a sectional view of the crescent PLOT column of FIG. 3 having an interior coating, according to an embodiment of the present disclosure.

Referring to FIG. 5, in one embodiment, the crescent PLOT column 300 further includes an interior coating 200 disposed on the capillary material 110 and forming the inner surface 106, the layer 102 of the particles 104 being disposed on the interior coating 200. The interior coating 200 may form a portion of the inner surface 106, essentially entire inner surface 106, or the entire inner surface 106. As used herein "essentially the entire inner surface 106" indicates at least about 80% of the inner surface 106, alternatively at least about 85% of the inner surface 106, alternatively at least about 90% of the inner surface 106, alternatively at least about 95% of the inner surface 106, alternatively at least about 98% of the inner surface 106, alternatively at least about 99% of the inner surface 106.

The interior coating 200 may be formed from any suitable material, including, but not limited to, organosilanes, siloxanes or polyethyleneglycols. In one embodiment, the interior coating 200 is a particle trap. In the crescent PLOT column 300, the interior coating 200 is consistently in close proximity from where a particle 104 may be released during operation of the crescent PLOT column 300, and a considerable portion of the inner surface 106 formed by the interior coating 200 is exposed to the open region 116 of the bore 114. This provides high particle trap coverage of the bore 114, while leaving the layer 102 of particles 104 unencumbered with any overcoat that may compromise the chromatographic performance. Further, because the adhesive trap (interior coating 200) is exposed along the entire axial length 400 of the crescent PLOT column 300, trimming the crescent PLOT column 300 during installation or maintenance is permitted. Further, in an embodiment in which the interior coating 200 includes organosilanes, the organosilane moieties are capable of orthogonal chromatographic separations, forming a parallel configuration for the separation mechanisms of the crescent PLOT column 300, yielding a combination of both PLOT species and phase species.

Figure 6:
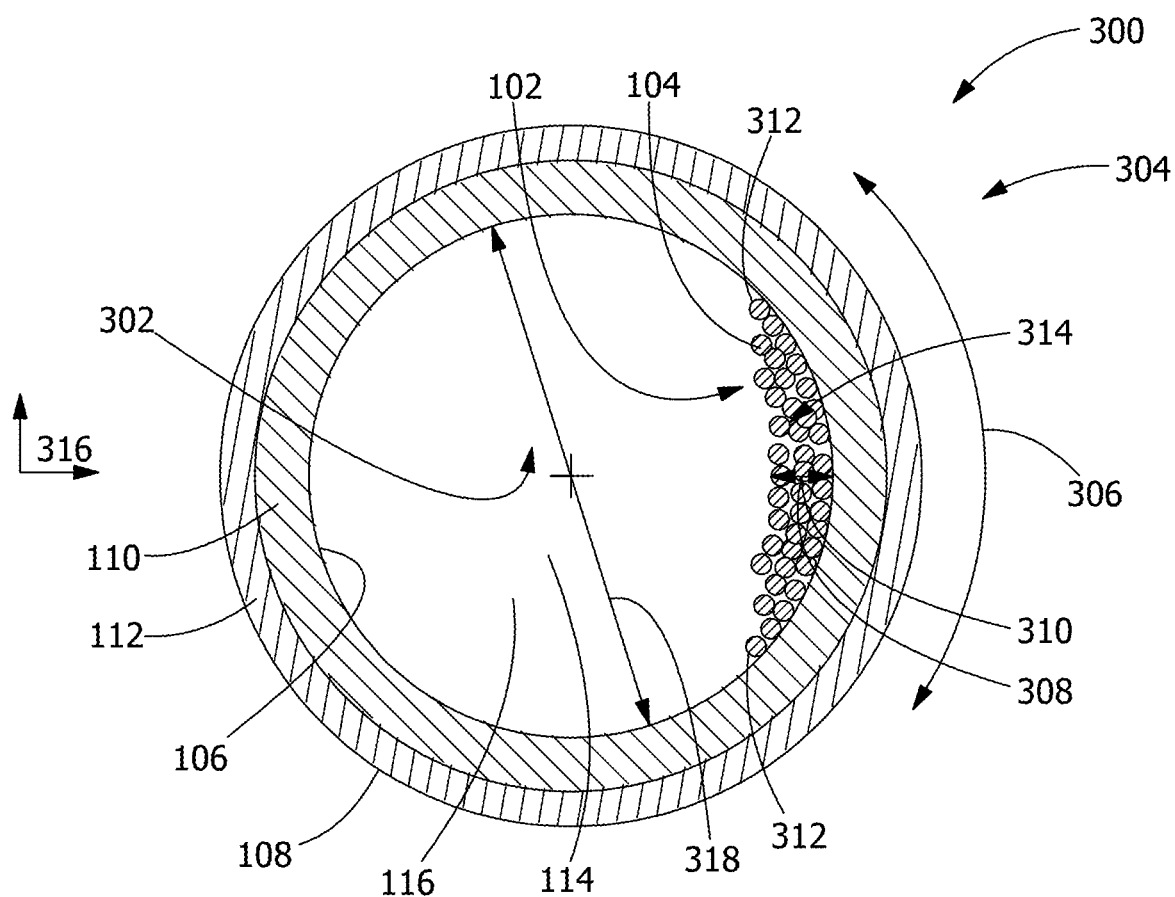
FIG. 6 is a sectional view of the crescent PLOT column of FIG. 3 having a reduced radial portion, according to an embodiment of the present disclosure.

Referring to FIG. 3 and FIG. 6, the radial portion 306 may be any suitable portion of the inner surface 106, including, but not limited to, up to about 50% of the inner surface 106, alternatively up to about 40% of the inner surface 106, alternatively up to about 30% of the inner surface 106, alternatively up to about 25% of the inner surface 106, alternatively between about 33% to about 67% of the inner surface 106, alternatively between about 20% to about 55% of the inner surface 106, alternatively between about 25% to about 50% of the inner surface 106.

Figure 7:
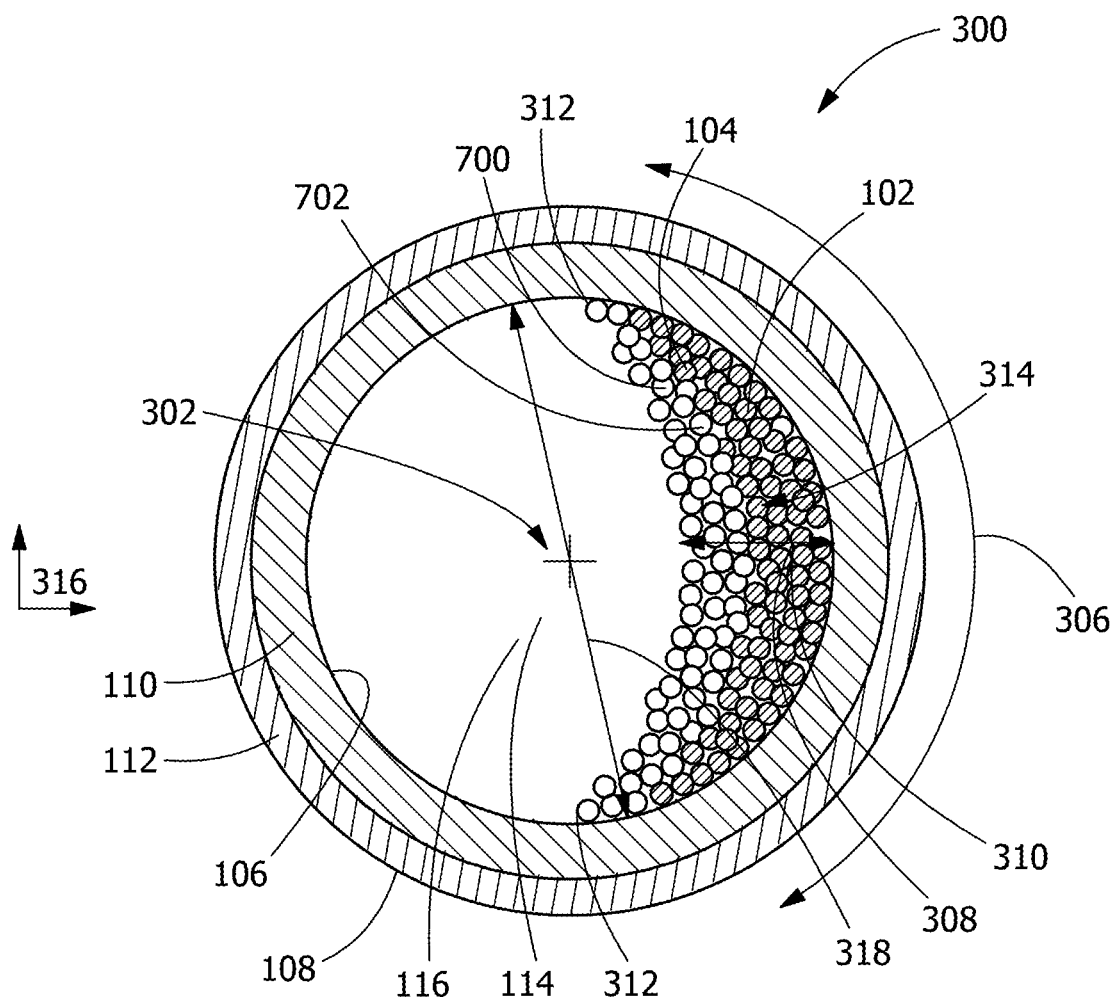
FIG. 7 is a sectional view of the crescent PLOT column of FIG. 3 including a second layer of distinct particles, according to an embodiment of the present disclosure.

Referring to FIG. 7, in one embodiment the crescent PLOT column 300 includes a second layer 700 having distinct particles 702 localized on the layer 102 of the particles 104. The distinct particles 702 of the second layer 700 may be distinct from the particles 102 with respect to any suitable attribute or property, including, but not limited to, chemical composition, dimension, porosity, shape, coating, and combinations thereof. The layers of particles may also be further augmented with secondary chemical treatments or coatings.

The nature of centrifuge application further results in a separation of particles based on their size and density. As a result, a gradient layer may also be created from a particle laden solution containing particles having more than one distinct particle type. Multiple layers of distinct particles may also be applied to form a gradient. The second layer 700 having distinct particles 702 may be localized on the layer 102 of the particles 104 which is disposed on the capillary material 110 (shown) or on the layer 102 of the particles 104 which is disposed on an interior coating 200 (not shown for this specific embodiment, but analogous to FIG. 5). In one embodiment, the layer 102 of particles 104 and the second layer 700 of distinct particles 702 provide distinct chromatographic behavior. Any number of additional layers of additional particles may also be included in the crescent PLOT column 300.

Figure 8:
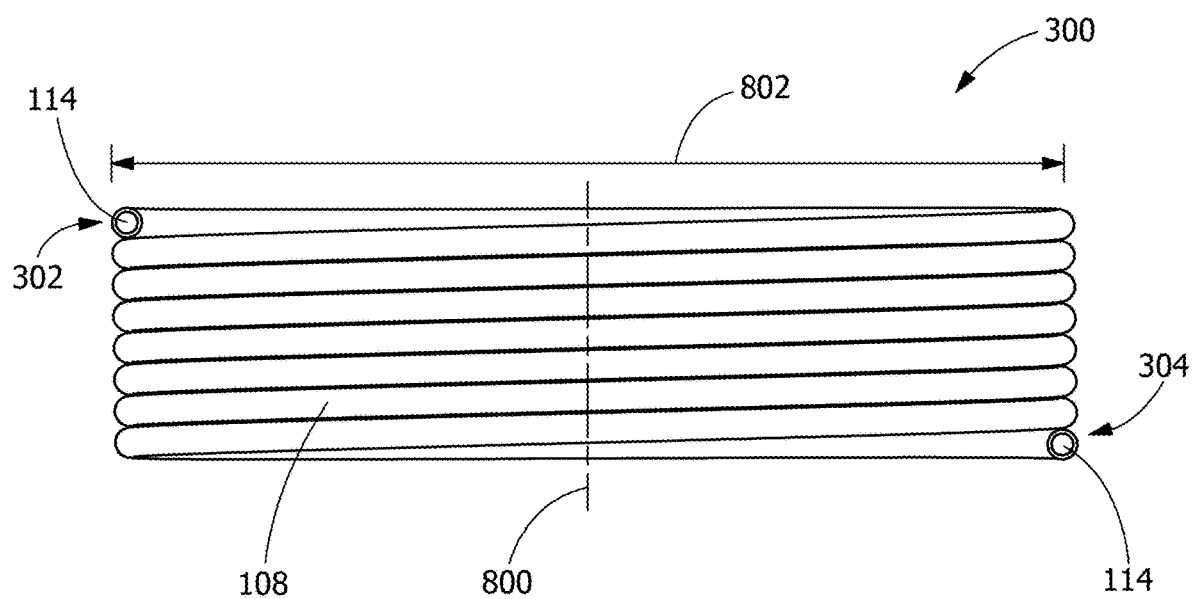
FIG. 8 is a side view of the crescent PLOT column of FIG. 3, according to an embodiment of the present disclosure.

Referring to FIG. 8, in one embodiment the crescent PLOT column 300 is coiled about a central axis 800, defining a coil diameter 802. In instances in which the crescent PLOT column 300 is coiled in multiple layers, the coil diameter 802 is the average diameter defined by the crescent PLOT column 300. The coil diameter 802 may be any suitable diameter, and the crescent PLOT column 300 may be coiled any suitable number of repetitions. The number of coil repetitions is dependent upon column length and coil diameter. Radius (i.e., one half of the coil diameter) and rotational speed determine effective centrifugal force.

Figure 9:
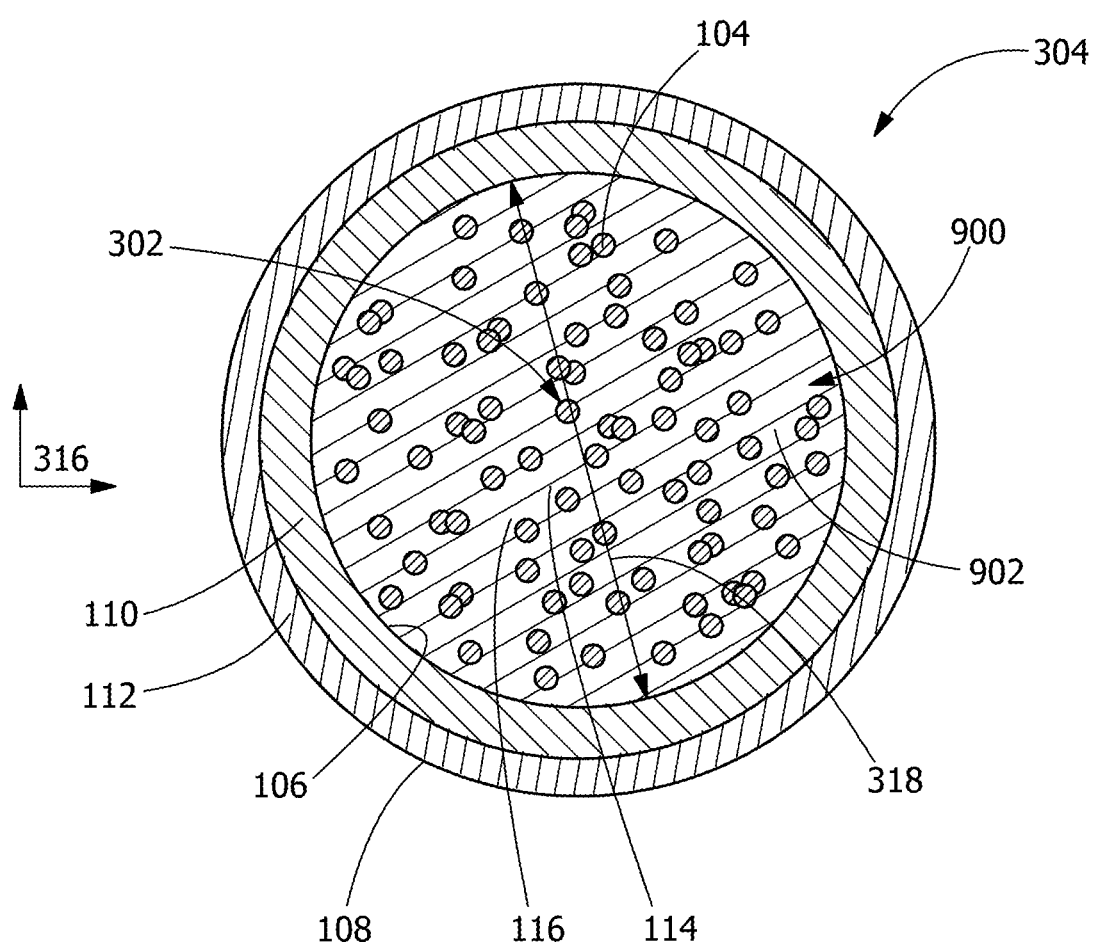
FIG. 9 is a sectional view of a capillary column loaded with a particle laden fluid, according to an embodiment of the present disclosure.
Figure 10:
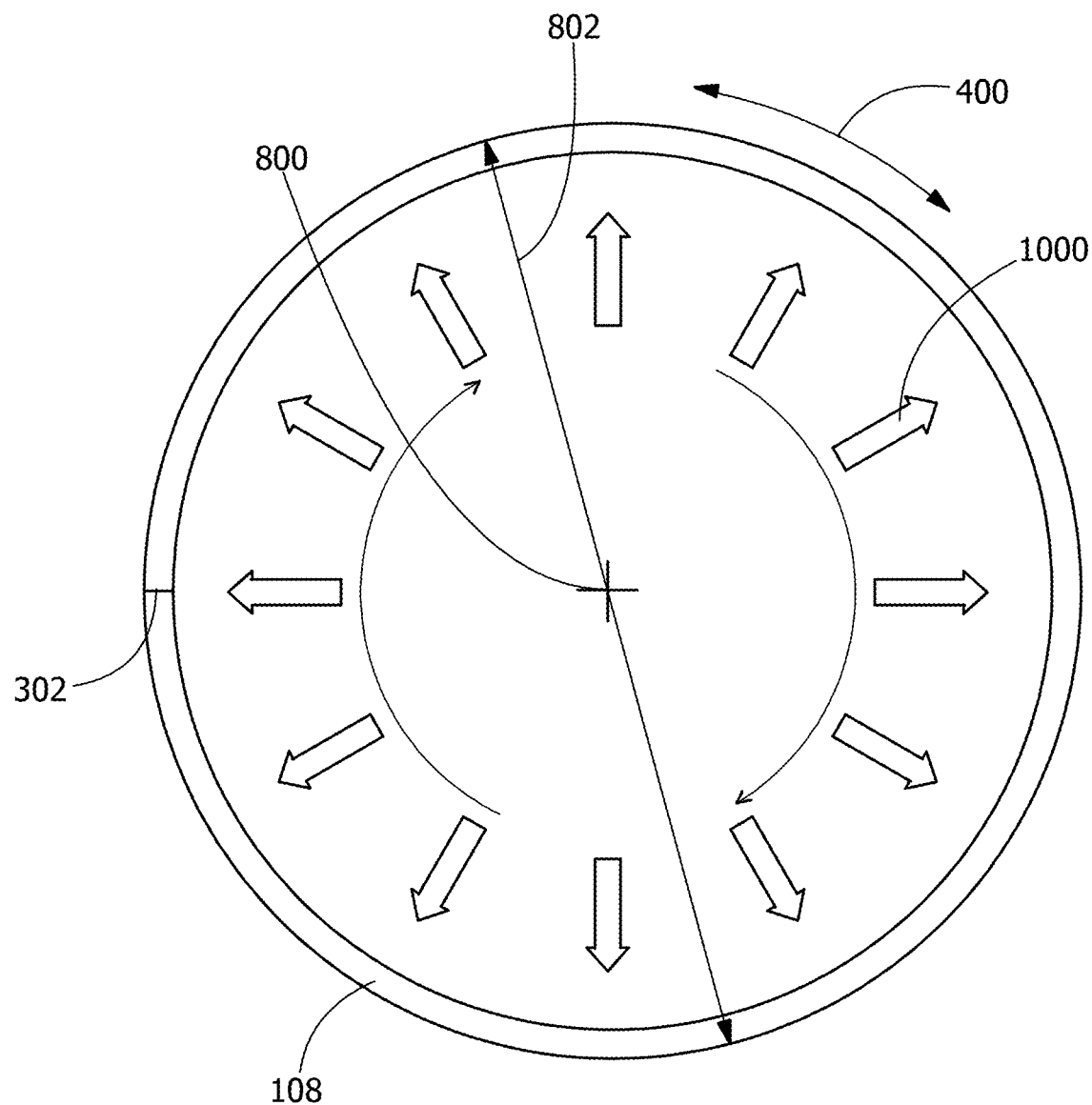
FIG. 10 is a top view of the capillary column loaded with a fluid of FIG. 9, according to an embodiment of the present disclosure.

Referring to FIG. 3, FIG. 9, and FIG. 10, in one embodiment, a method for preparing a crescent plot column 300 includes loading a capillary column 108 with a fluid 900 such that the fluid 900 is contained within the capillary column 108. The capillary column 108 includes an inlet 302, an outlet 304, a bore 114, and an inner surface 106 surrounding the bore 114 and extending between the inlet 302 and the outlet 304. The fluid 900 includes a carrier 902 and particles 104. The capillary column 108 and the fluid 900 contained within the capillary column 108 are subjected to a centrifugal force (illustrated schematically by arrows 1000). The carrier 902 is removed, and the layer 102 of the particles 104 is localized on a radial portion 306 of the inner surface 106, the layer 102 of the particles 104 including a radial thickness 308 decreasing from a center 310 of the radial portion 306 to a periphery 312 of the radial portion 306, forming a crescent shape 314 in a radial frame of references 316. Prior to collating the capillary column 108 with the fluid 900, the capillary column 108 may be coated with an interior coating 200 (not shown for this specific embodiment, but analogous to FIG. 5).

Containing the fluid 900 within the capillary column 108 may include plugging the inlet 302 and the outlet 304 following introduction of the fluid 900.

In one embodiment, the radial thickness 308 increases or decreases with the increase or decrease, respectively, of the concentration of the particles 104 in the fluid 900. The precise crescent shape 314 formed may be influenced by a combination of the concentration of the particles 104 in the fluid 900, the cross-sectional shape of the bore 114, and the topological shape of the inner surface 106.

The centrifugal force may be uniform or non-uniform. Subjecting the capillary column 108 to the centrifugal force may include spinning the capillary column 108 and the fluid 900 contained within the capillary column 108 about the central axis 800. Spinning the capillary column 108 and the fluid 900 contained within the capillary column 108 may be performed with a centrifuge (not shown).

In one embodiment, subjecting the capillary column 108 and the fluid 900 contained within the capillary column 108 to the centrifugal force localizes the layer 102 of the particles 104 essentially uniformly, alternatively uniformly, along an axial length 400 of the inner surface 106.

Preparing the crescent PLOT column 300 may occur over any suitable length of time commencing with loading the capillary column 108 with the fluid 900. In one embodiment, preparing the crescent PLOT column 300 commencing with loading the capillary column 108 with the fluid 900 occurs in less than about two hours, alternatively less than about one hour, alternatively less than about 45 minutes, alternatively less than about 30 minutes. The rotational speed (number of revolutions per minute) and spin duration conditions are primarily dependent on the cross sectional area of the column, column coil radius, particle composition and morphology, and solvent viscosity.

Referring to FIG. 7, FIG. 9, and FIG. 10, in one embodiment, following localizing the layer 102 of the particles 104 on the radial portion 306 of the inner surface 106, the capillary column 108 is loaded with a second fluid (not shown) such that the second fluid is contained within the capillary column 108. The second fluid includes a second carrier (not shown) and distinct particles 702, polymer or chemical modifiers. The capillary column 108 and the second fluid contained within the capillary column 108 is subjected to the centrifugal force 1000, and the second carrier is removed. A second layer 700 of the distinct particles 702 is localized on the layer 102 of the particles 104.

Examples

A comparative example (with no particles 104) and an inventive example (analogous to FIG. 5) were prepared. Both the comparative example and the inventive example were prepared with capillary columns 108 having essentially equivalent dimensions (30 meters of 0.53 I.D. mm fused silica (Microquartz, Germany) and testing was performed with the same run conditions. Both the comparative example and the inventive example included deactivated inner surfaces 106.

Deactivation of the inner surfaces 106 of the comparative example and the inventive example was achieved by preparing a deactivation solution by dissolving polyethylene glycol (PEG; H—(O—$CH_2$—$CH_2$)$_n$—OH average MW 20,000) in dichloromethane ($CH_2Cl_2$), and then wetting the inner surfaces 106 by passing one volume of the deactivation solution completely through the capillary columns 108. The capillary columns 108 were then dried under an inert gas flow, heated under an inert gas flow, rinsed with $CH_2Cl_2$, and then dried again under an inert gas flow.

Preparation of the inventive example included preparing the fluid 900 by adding a powdered porous polymer (composition being a copolymer of ethylene glycol dimethacrylate and divinylbenzene) (the particles 104) to a carrier 902 comprising a solvent mixture of $CH_2Cl_2$ and pentane, the concentration of the particles 104 in the fluid 900 being about 2.3% wt/vol). The fluid 900 was mechanically shaken until homogeneous. The fluid 900 was placed into a pressurized vessel with one end of the capillary column 108 inserted into the vessel below the liquid meniscus of the fluid 900. Nitrogen pressure was then applied to the vessel, forcing the fluid 900 into the capillary column 108. After the capillary column 108 was filled with the fluid 900, the pressure in the vessel was released and one end of the capillary column 108 was sealed.

The capillary column 108 was coiled (to about a seven inch coil diameter 802) inside of a custom-fabricated rotor adapter and placed horizontally inside of a HERAEUS INSTRUMENTS LABOFUGE 400 centrifuge, and centrifuged at a rate of about 3500 rpm for 60 minutes. The capillary column 108 was then carefully removed from the rotor adapter so as to avoid disturbing the stratification of the particles 104 along the inner surface 106. The capillary column 108 was then suspended horizontally in a 30° C. water bath (allowing full water circulation around the capillary column 108), with the sealed end secured above the water level in the bath and the other (free) end of the capillary column 108 connected to a closed vacuum port on a manifold connected to a vacuum pump capable of generating a vacuum of 40 Torr (about 1.5 inches of Hg). The vacuum port was switched to the on position to begin evaporating the carrier 902 inside the column. The evaporation proceeded to completion over 18 hours, leaving behind the layer 102 of the particles 104 having the crescent shape 314, and thereby forming a crescent PLOT column 300. The crescent PLOT column 300 was disconnected from the vacuum port and removed from the bath. The sealed end of the crescent PLOT column 300 was clipped off, and the crescent PLOT column 300 was heated under an inert gas flow (15 psi head pressure) to 190° C. for 18 hours.

Each of the comparative example and the inventive example were installed into a GC having the following attributes and settings:

Instrument type: Hewlett Packard 5890 Gas Chromatograph
Injection temperature: 190° C.
Detector temperature: 190° C.
Oven temperature: 150° C. isothermal
Column dead time: 1.845 minutes
Detector type: Flame Ionization
Carrier gas: Hydrogen (~2.0 p.s.i.)
Injection volume: 1.0 µL+0.5 µL $CH_4$
Injection type: Split
Split flow: 235 mL/min
Linear velocity 28.9 cm/sec.

Each of the comparative example and the inventive example were injected with 1.0 µL of "Q-BOND and U-BOND Column Test Mix" (Restek catalog. #:35202):

0.1% vol/vol each in heptane
n-Pentane (109-66-0)
n-Hexane (110-54-3)
Acetone (67-64-1)
Diethyl ether (ethyl ether) (60-29-7)
Ethanol (64-17-5)
Ethyl acetate (141-78-6)
Methanol (67-56-1).

The test mix solvent (heptane) eluted after all the analytes of interest. Data collection was halted after the elution of the final analyte (ethyl acetate). The chromatographic run continued to ensure the elution of the solvent (heptane) from the column.

Figure 11:
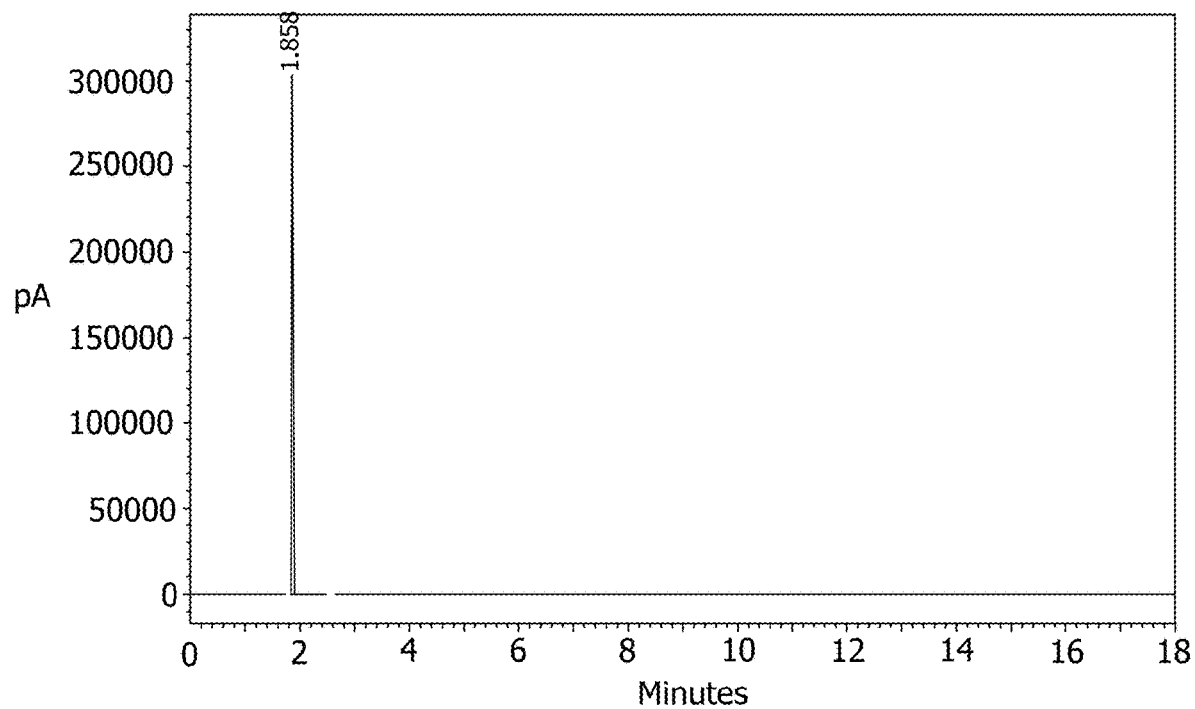
FIG. 11 is a chromatographic analysis of Q-BOND and U-BOND Column Test Mix (Restek) using a deactivated 30 meter blank column as a comparative example.
Figure 12:
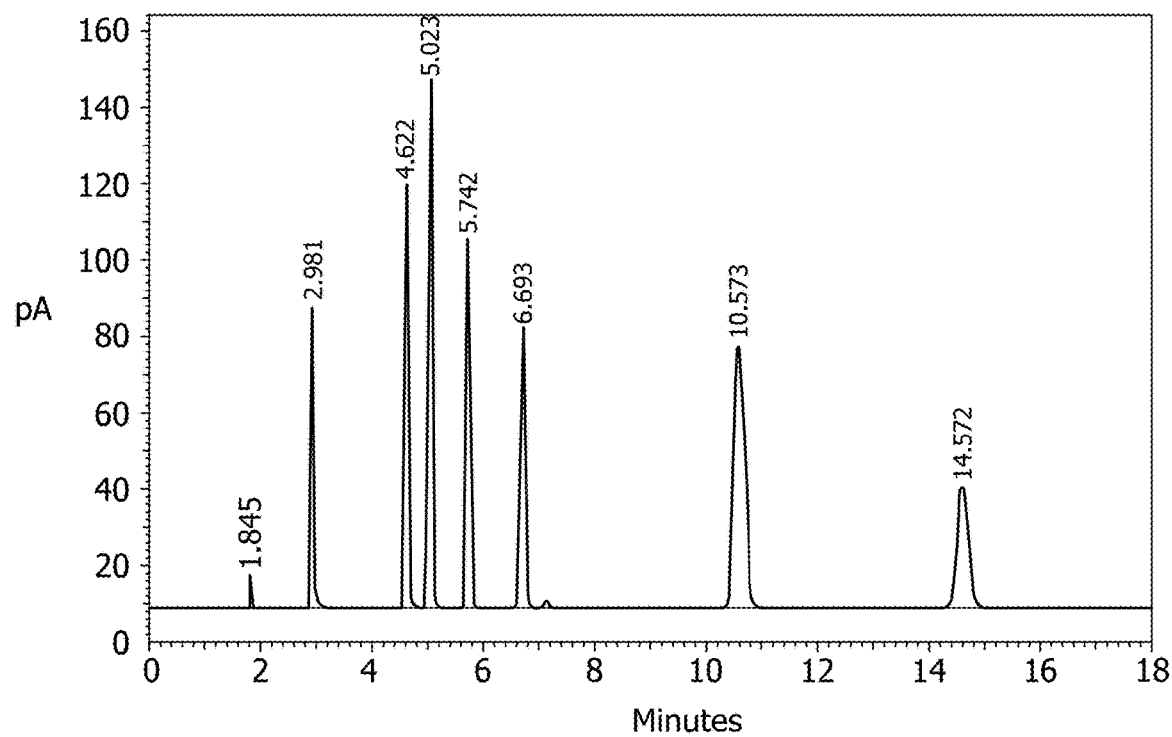
FIG. 12 is a chromatographic analysis of Q-BOND and U-BOND Column Test Mix (Restek) using a 30 meter deactivated crescent PLOT column as an inventive example.

Referring to FIG. 11 and FIG. 12, the comparative example yields effectively no retention (no separation of the test compounds observed), whereas the inventive example yields full separation of the test compounds. This suggests that all test compound retention is from the particles 104, and collisions between the test compounds and the inner surface 106 are largely elastic. Further, peak symmetry is maintained for the inventive example, suggesting the crescent shape 314 of the layer 102 of particles 104 is essentially uniform along the axial length 400 of the crescent PLOT column 300 of the inventive example. No indication of data spike noise, commonly associated with fugitive particles 104 in standard PLOT column 100 was observed for either the comparative example or the inventive example.

Figure 13:
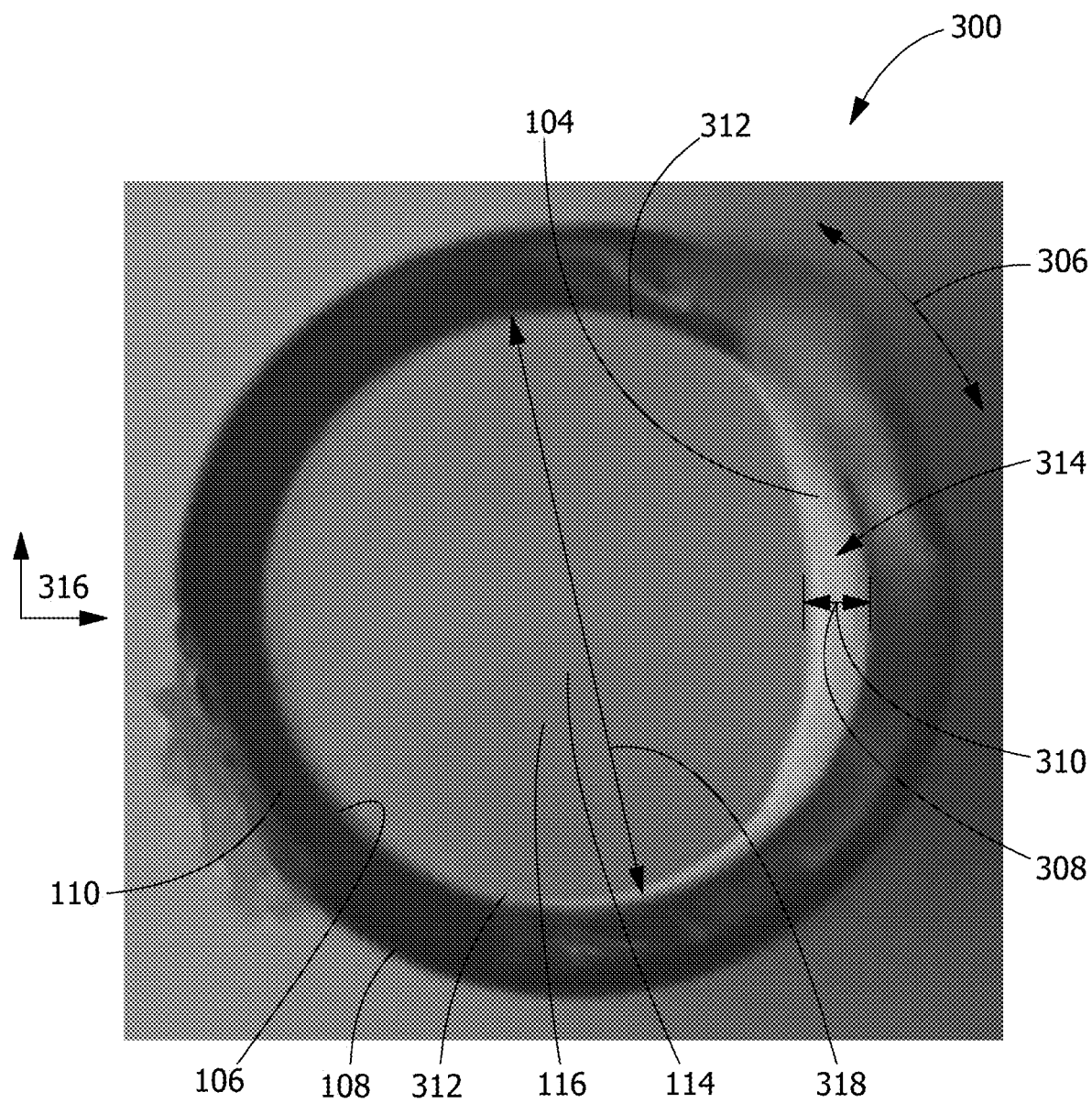
FIG. 13 is a photographic cross-section of a crescent PLOT column, according to an embodiment of the present disclosure.

Referring to FIG. 13, a photographic cross-section of a crescent PLOT column 300 having the following attributes and settings is shown for illustrative purposes:

Column Length: 1 meter
Column ID: 0.53 mm
Centrifuge spin rate: 3,500 RPM
Duration: 3 minutes
Photo: Nikon SMZ 1000.

While the foregoing specification illustrates and describes exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A crescent porous layer open tubular ("PLOT") column, comprising:
   a capillary column, the capillary column including:
      an inlet;
      an outlet;
      a bore; and
      an inner surface, the inner surface surrounding the bore and extending between the inlet and the outlet; and
   a layer of particles localized on a radial portion of the inner surface, the layer of the particles including a radial thickness decreasing from a center of the radial portion to a periphery of the radial portion, forming a crescent shape in a radial frame of reference.

2. The crescent PLOT column of claim 1, wherein the layer of the particles is essentially uniform along an axial length of the inner surface.

3. The crescent PLOT column of claim 2, wherein the layer of the particles is uniform along the axial length of the inner surface.

4. The crescent PLOT column of claim 1, wherein the capillary column includes a capillary material, and the capillary material includes fused silica.

5. The crescent PLOT column of claim 1, wherein the capillary column includes a capillary material, and the capillary material includes metal.

6. The crescent PLOT column of claim 1, wherein the capillary column includes a capillary material, and the crescent PLOT column includes an interior coating disposed on the capillary material, the interior coating forming the inner surface and the layer of the particles being disposed on the interior coating.

7. The crescent PLOT column of claim 6, wherein the coating forms essentially the entire inner surface.

8. The crescent PLOT column of claim 6, wherein the coating is a particle trap.

9. The crescent PLOT column of claim 1, wherein the particles are porous.

10. The crescent PLOT column of claim 1, wherein the particles are non-porous.

11. The crescent PLOT column of claim 1, wherein the particles include an organic polymer.

12. The crescent PLOT column of claim 1, wherein the particles include an inorganic material.

13. The crescent PLOT column of claim 1, wherein the particles include a solid substrate and a chromatographic phase disposed on the solid substrate.

14. The crescent PLOT column of claim 1, further including a second layer having distinct particles localized on the layer of the particles, the distinct particles of the second layer being distinct from the particles with respect to chemical composition, dimension, porosity, shape, coating, or combinations thereof.

15. A method for preparing a crescent porous layer open tubular ("PLOT") column, comprising:
   loading a capillary column with a fluid such that the fluid is contained within the capillary column, wherein:
      the capillary column includes:
         an inlet;
         an outlet;
         a bore; and
         an inner surface, the inner surface surrounding the bore and extending between the inlet and the outlet; and
      the fluid includes:
         a carrier; and
         particles;
   subjecting the capillary column and the fluid contained within the capillary column to a centrifugal force;
   removing the carrier; and
   localizing a layer of the particles on a radial portion of the inner surface, the layer of the particles including a radial thickness decreasing from a center of the radial portion to a periphery of the radial portion, forming a crescent shape in a radial frame of reference.

16. The method of claim 15, wherein the centrifugal force is uniform.

17. The method of claim 15, wherein subjecting the capillary column and the fluid contained within the capillary column to the centrifugal force includes spinning the capillary column and the fluid contained within the capillary column with a centrifuge.

18. The method of claim 15, wherein subjecting the capillary column and the fluid contained within the capillary column to the centrifugal force localizes the layer of the particles essentially uniformly along an axial length of the inner surface.

19. The method of claim 15, wherein preparing the crescent PLOT column commencing with loading the capillary column with the fluid occurs in less than about one hour.

20. The method of claim 15, further including, following localizing the layer of the particles on the radial portion of the inner surface:
   loading the capillary column with a second fluid such that the second fluid is contained within the capillary column, the second fluid including:
      a second carrier; and
      distinct particles;
   subjecting the capillary column and the second fluid contained within the capillary column to the centrifugal force;
   removing the second carrier; and
   localizing a second layer of the distinct particles on the layer of the particles, the distinct particles of the second layer being distinct from the particles with respect to chemical composition, dimension, porosity, shape, coating, or combinations thereof.

* * * * *